No. 11,946. Reissued Nov. 19, 1901.
H. A. VERGE.
DIVIDED PLANE.
(Application filed Oct. 15, 1901.)
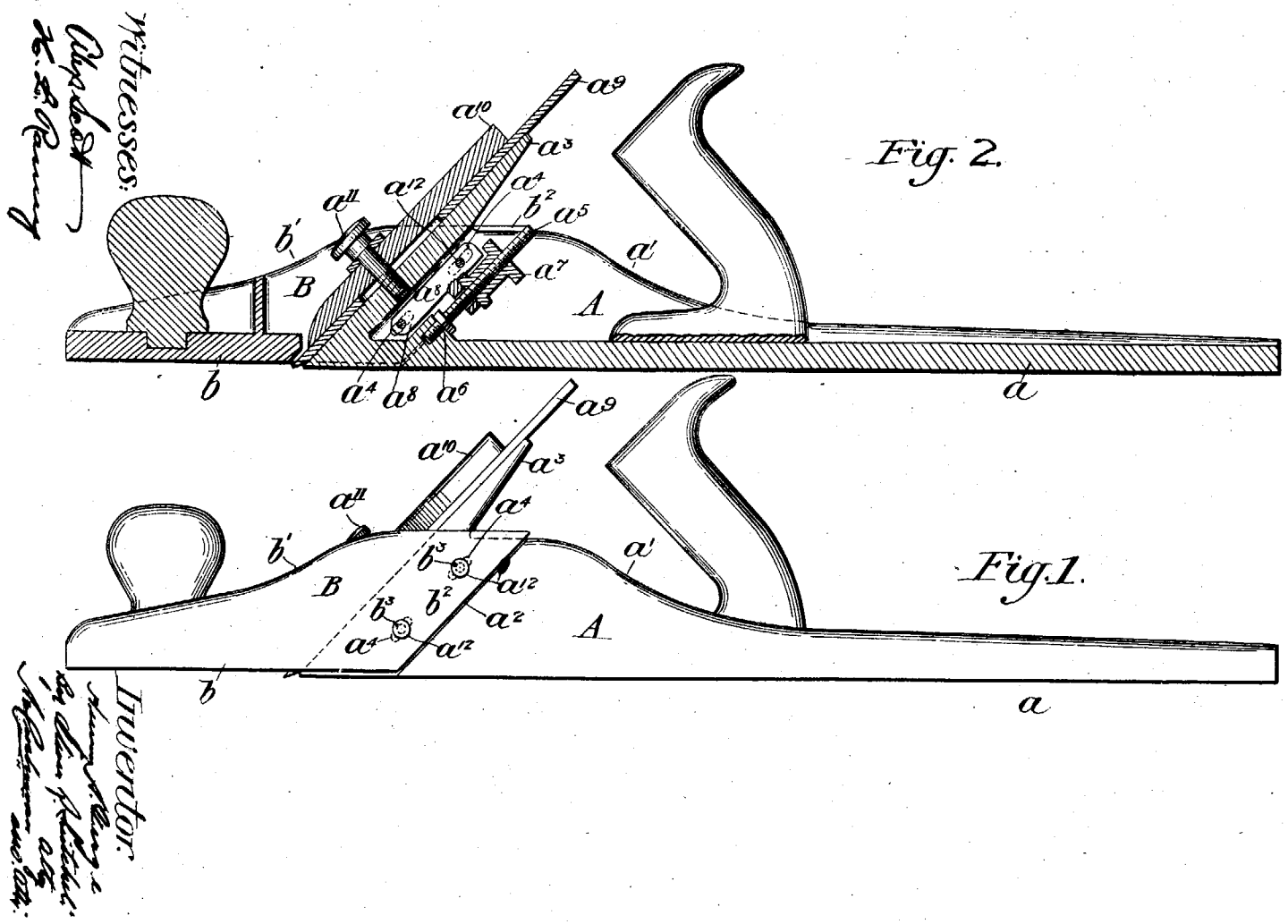
Witnesses:
Alex Scott
H. L. Ramey
Inventor:
Henry A. Verge
by Chas. F. Mitchell
Atty
Wm. Redmond
Asso. Atty.

UNITED STATES PATENT OFFICE.

HENRY A. VERGE, OF STOUGHTON, MASSACHUSETTS, ASSIGNOR OF ONE-HALF TO GEORGE E. BELCHER, OF STOUGHTON, MASSACHUSETTS.

DIVIDED PLANE.

SPECIFICATION forming part of Reissued Letters Patent No. 11,946, dated November 19, 1901.

Original No. 675,533, dated June 4, 1901. Application for reissue filed October 15, 1901. Serial No. 79,784.

*To all whom it may concern:*

Be it known that I, HENRY A. VERGE, of Stoughton, in the county of Norfolk and State of Massachusetts, have invented a Divided Plane, of which the following is a specification, reference being had to the accompanying drawings, in which—

Figure 1 is a side elevation of a divided plane embodying one form of my invention. Fig. 2 is a central longitudinal sectional view of the plane shown in Fig. 1.

The object of my invention is to provide a plane in which the regulation of the depth of the cut by the blade of the plane shall be effected by simple adjusting means controlled and operating upon a new principle so far as I am aware.

In planes as heretofore constructed it has been customary to form the bottom of the plane as a plane surface having at some position in its length, crosswise thereof, an aperture through which the cutting edge of the plane was protruded to such an extent as desired, the blade being clamped in position. The extent to which the blade was protruded below the plane surface of the bottom of the plane controlled the thickness of the shaving removed.

Various devices have been heretofore used for regulating the adjustment of the blade and for securing the same end by adjusting other parts of the plane in their relations to the blade. For example, it has been practiced to have some portion of the bottom surface of the plane in front of the blade capable of downward movement, whereby the blade having been in a rough fashion protruded below the bottom surface of the plane to a certain extent the final regulation was secured by adjusting this forward movable portion of the plane downward to neutralize to such an extent as desired the protrusion of the blade. In some other devices a portion of the bottom surface of the plane in front of the blade has been capable of adjustment longitudinally of the plane to increase or diminish the extent of the opening just in front of the blade by bringing the edge of this forward movable portion of the bottom of the plane nearer to the blade to decrease the extent of the opening or by moving this forward movable portion away from the blade and toward the forward end of the plane to increase the opening.

My new plane consists, essentially, of two parts, the rear portion of the plane, which carries the blade, and a separate forward portion of the plane, which slides in ways upon the forward end of the rear portion of the plane and is capable of bodily adjustment upward, being controlled in this adjustment by suitable mechanism mounted upon the rear part of the plane.

In the drawings the rear or body portion of the plane is marked A, the bottom face of this portion being marked $a$ and the sides $a'$. The front end of my divided plane is marked B, the bottom face of that end $b$, and the sides $b'$. At the front end of part A ways $a^2$ are formed, which are adapted to receive the rear end of the sides $b'$ of part B, and at the extreme forward end of part A a sloping bed $a^3$, forming the forward end or face of the body A, is formed, this sloping bed having at about its middle portion a screw-threaded aperture to receive one end of a clamping-screw, as will be hereinafter more fully described. Through the sides $a'$ of part A adjacent to the ways $a^2$ are slots $a^4$, and within the sides $a'$ and adjacent to the sloping bed $a^3$ is fixed a screw $a^5$, fast in a block $a^6$ on the bottom $a$ of the plane. This screw $a^5$ carries a thumb-nut $a^7$ and a carriage $a^8$, lugs on which embrace the thumb-nut, so that rotation of the nut on the screw will move the nut and also the carriage lengthwise of the screw. The carriage $a^8$ has apertures registering with the slots $a^4$. The blade $a^9$ having been placed in position upon the sloping bed $a^3$ and a clamping-plate $a^{10}$ having been placed in position, the clamping-screw $a^{11}$ is screwed through suitable slots in blade $a^9$ and in clamping-plate $a^{10}$, the edge of blade $a^9$ being allowed to come in line with the bottom of part A—that is to say, adjustment of the blade $a^9$ is effected by laying part A upon a plane surface and allowing blade $a^9$ to drop until its edge strikes the plane surface. The blade $a^9$ is then clamped in this position, the clamping-block $a^{10}$ being formed to slightly expose the cutting edge of the blade $a^9$. The forward part B is then placed in position, its rear edges $b^2$ being placed upon ways $a^2 a^2$, and bolts $a^{12}$ are passed through the apertures $b^3$ in the rear edges of part B and the slots $a^4$ through the apertures in the carriage $a^3$. The plane is now ready for adjustment to regulate the thickness of the shaving to be cut, and this is effected by operating nut $a^7$ to raise part B upward, the part B moving with the carriage $a^8$ in its rise on screw $a^5$ and being held firmly in position in its travel by the coöperation of the ways $a^2$ and the edges $b^2$ of the rear end of the sides $b'$ of part B.

Obviously the fore part B of the plane will require but slight upward movement to give any practical thickness of shaving required, and when so adjusted the two parts of the plane will be on two distinct levels, the forward part B being by the thickness of the required shaving higher than the rear part A. The plane so adjusted will be found to give an absolutely smooth and true cut, for during the progress of the cutting both parts of the plane B and A bear perfectly true and flat upon the surface being planed, the part B traveling at its own level in front of the cutting-blade and the part A traveling at its own distinct level behind the cutting-blade after the cutting-blade has removed from the surface of the article being planed the required thickness of material.

I claim—

1. The divided plane above described, made up of a rear part having ways formed at its forward end; a fore part having rearward portions engaging and moving upon those ways; a screw-and-nut device mounted at the front end of the rear part; and a connection between the screw-and-nut device and the fore part, whereby the vertical adjustment of the fore part, with regard to the rear part, may be secured and controlled.

2. The divided plane above described, made up of a rear part having ways formed at its forward end, the fore part having rearward portions adapted to engage and move upon those ways; and means to hold the fore part in position upon the ways and to control its position thereon.

HENRY A. VERGE.

Witnesses:

JAMES BELCHER,

FRANK E. HUSSEY.